AUTOMATIC TITRATION APPARATUS
Original Filed July 1, 1954 6 Sheets-Sheet 1
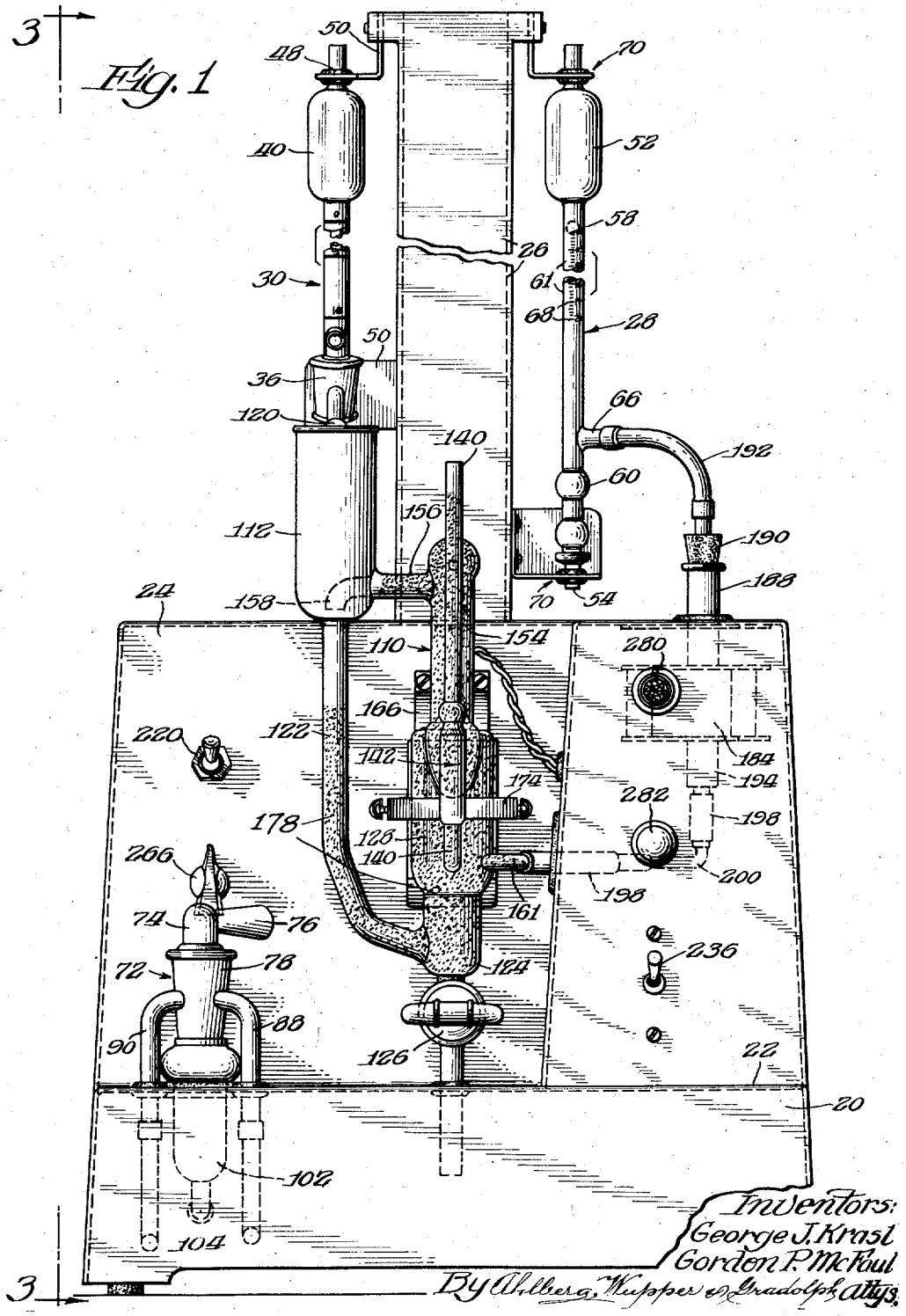
Inventors:
George J. Krasl
Gordon P. McPaul
By Albers, Wupper & Gradolph Attys.

AUTOMATIC TITRATION APPARATUS

Original Filed July 1, 1954 6 Sheets-Sheet 2

Inventors:
George J. Krasl
Gordon P. McKaul
By Ahlberg, Hupper & Gradolph Attys.

AUTOMATIC TITRATION APPARATUS

Original Filed July 1, 1954 6 Sheets-Sheet 3

Inventors:
George J. Krasl
Gordon P. McFaul
By Albers, Wiggins & Gradolph Attys.

AUTOMATIC TITRATION APPARATUS
Original Filed July 1, 1954 6 Sheets-Sheet 4
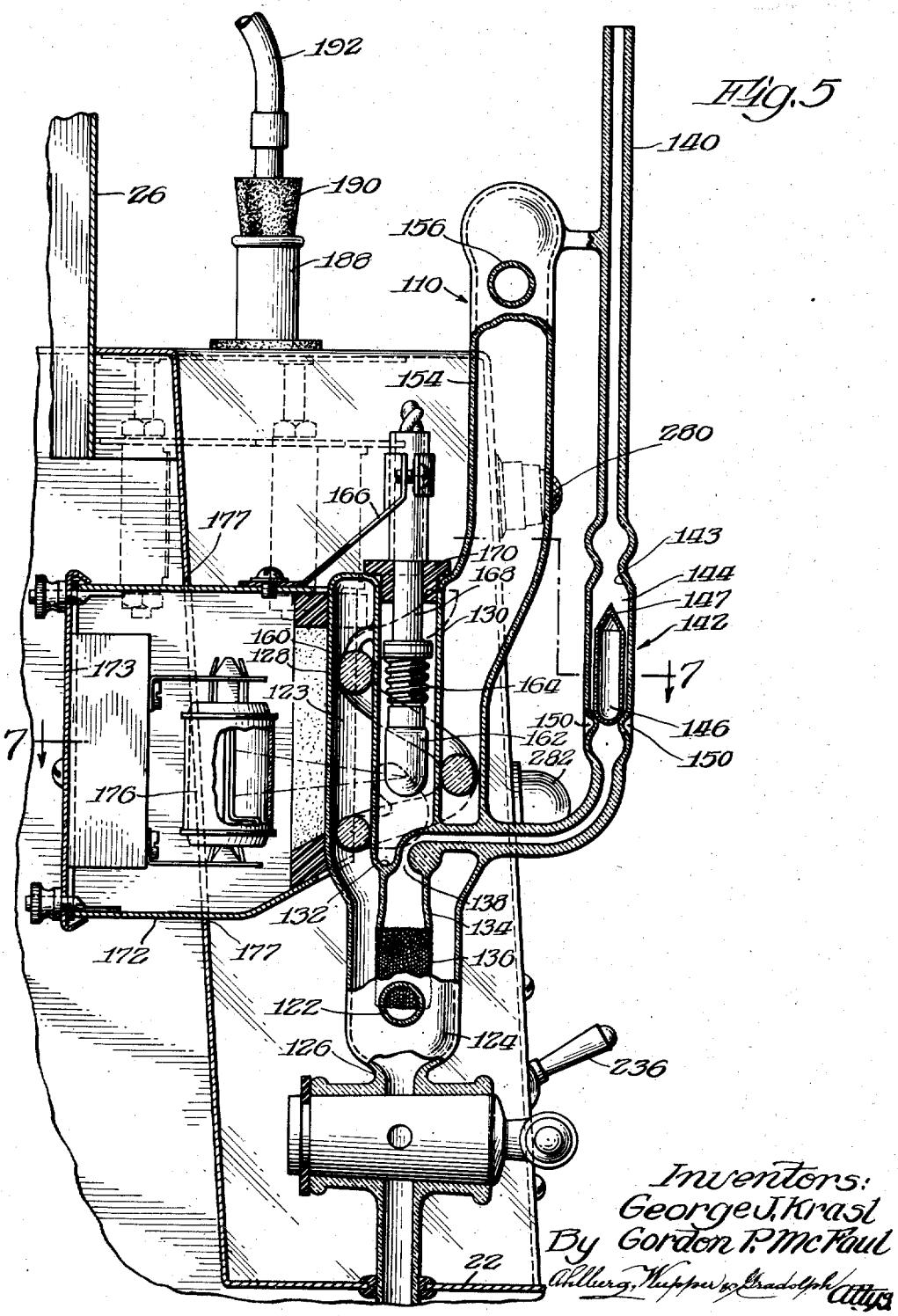

AUTOMATIC TITRATION APPARATUS
Original Filed July 1, 1954 6 Sheets-Sheet 5
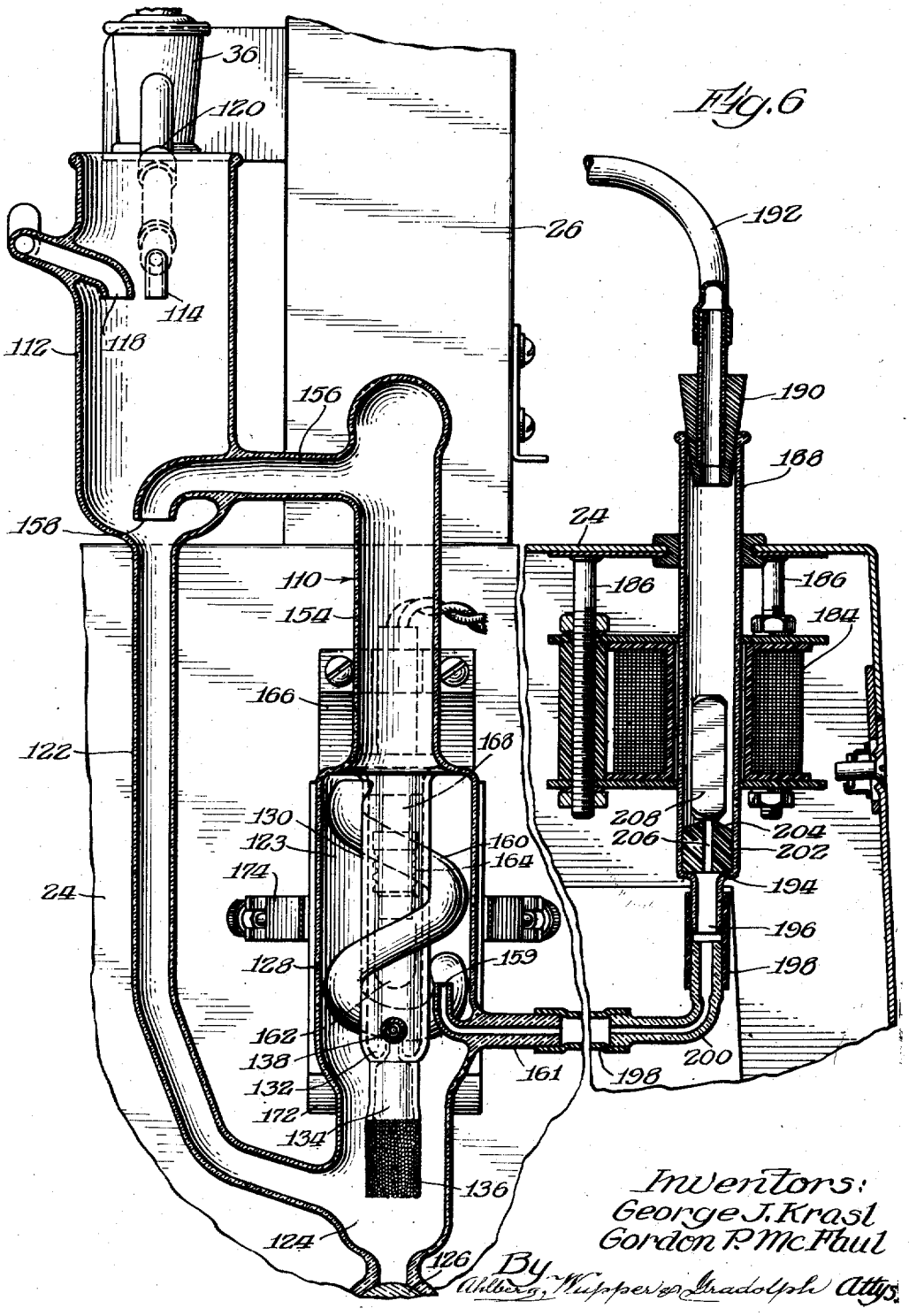

AUTOMATIC TITRATION APPARATUS
Original Filed July 1, 1954 6 Sheets-Sheet 6
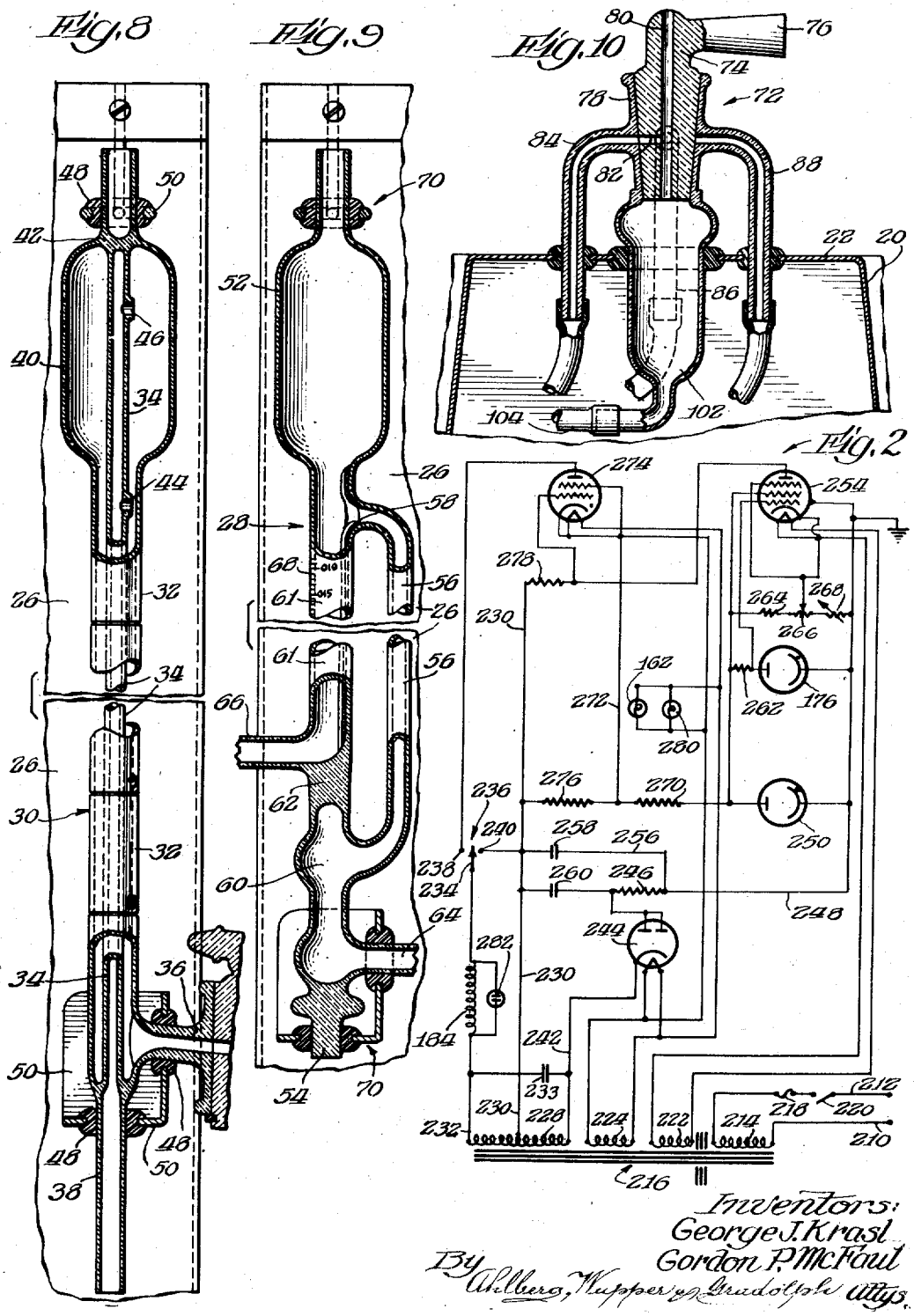

United States Patent Office

Re. 24,553

Reissued Oct. 21, 1958

24,553

AUTOMATIC TITRATION APPARATUS

George J. Krasl and Gordon P. McFaul, St. Joseph, Mich., assignors to Laboratory Equipment Corporation, St. Joseph, Mich., a corporation of Michigan Original No. 2,812,242, dated November 5, 1957, Serial No. 440,742. July 1, 1954. Application for reissue April 17, 1958, Serial No. 732,759

9 Claims. (Cl. 23—253)

Matter enclosed in heavy brackets [ ] appears in the original patent but forms no part of this reissue specification; matter printed in italics indicates the additions made by reissue.

The present invention relates to the art of chemical analysis, and is primarily concerned with apparatus for performing a volumetric titration, particularly a titration for sulfur.

Although the specific apparatus shown and described herein as illustrative of the present invention is particularly adapted for the quantitative determination of sulfur, the apparatus, with minor modifications which will be apparent, can be used for other volumetric titrations.

One method which is used for the determination of the quantity of sulfur in steel, limestone, oils, rubbers and other substances is to burn a weighed sample of the substance in oxygen in such a manner as to convert the sulfur constituent thereof into sulfur-dioxide gas. The mixed products of combustion thus produced, including the sulfur dioxide, are passed to an absorption cell where the sulfur dioxide is absorbed and reacts with iodine and water to produce sulfuric acid and hydrogen iodine. The quantity of iodine which thus reacts can be determined by using starch as an indicator, the starch solution being blue in the presence of free iodine and becoming substantially colorless when the iodine is converted to hydrogen iodine.

For this determination three solutions are ordinarily made available. One of these contains potassium iodate in known concentration and is commonly known as the "iodate solution." Another solution is dilute hydrochloric acid, while indicator made up of starch, potassium iodine and water comprises the third solution. The titration is usually conducted by substantially filling the absorption vessel with hydrochloric acid solution and then adding a small quantity of the starch solution. This mixture is substantially colorless until a few drops of the iodate solution have been added thereto. As soon as this occurs, the following reaction takes place:

$$KIO_3+5KI+6HCl=3I_2+6KCl+3H_2O$$

The free iodine thus produced turns the starch solution blue and the intensity of the blue depends upon the concentration of the iodine.

After the apparatus has been set up as described above, so that the solution has preferably a light blue color, the weighed sample to be tested is burned in oxygen and the gas produced is passed into the solution. The reaction that takes place is as follows:

$$SO_2+I_2+2H_2O=H_2SO_4+2HI$$

The sulfur dioxide gas, therefore, reacts to remove the free iodine from solution, thereby bleaching out the blue color. As the technician detects a fading in the blue color, he continuously adds small increments of the iodate solution from a burette in an attempt to maintain the blue color at a constant degree of intensity. The end of the titration is indicated when the blue color no longer fades even though no more iodate solution is added. At this juncture the quantity of iodate solution used during the titration can be read from the burette and from this the quantity of sulfur in the original sample can be determined from the following equation:

$$2I=S$$

Ordinarily the calculations involved in this method of analysis are avoided by using an iodate solution of appropriate concentration in connection with a burette so graduated that the burette gives a direct reading in terms of sulfur percentage when the original sample is weighed to some predetermined mass, such as one-half gram, for instance. It will be seen that this technique needs constant monitoring by a person of considerable skill in order to obtain a high order of accuracy, since precision requires that the final color match the original color.

One of the objects of the present invention is to provide novel apparatus and a method for carrying out a determination for sulfur according to the general scheme indicated above, but in which the titration is conducted fully automatically without attention.

An additional object of the present invention is to provide novel apparatus to perform a quantitative titration for sulfur fully automatically and with a higher degree of accuracy than is possible by the conventional inspection technique.

Still another object is to provide novel apparatus for expediting the determination of the sulfur content of a sample to be analyzed.

Still another object is to provide novel apparatus for automatically performing a chlorimetric titration operation.

*Another object is to provide improved titrating apparatus which will operate with assured reliability to accurately sense photoelectrically the true optical condition of a reacting fluid as it reacts with bubbles of gas moving upwardly through the fluid.*

Other objects and advantages will become apparent from the following description of a preferred embodiment of our invention which is illustrated in the accompanying drawings in which similar characters of reference refer to similar parts throughout the several views.

In the drawings,

Figure 1 is a front elevation of apparatus which incorporates the invention;

Fig. 2 is an electrical diagram illustrating a portion of the apparatus;

Fig. 5 is a fractional sectional view taken in a vertical plane substantially along the line 5—5 of Fig. 4 in the direction indicated by the arrows;

Fig. 6 is a fractional sectional view at right angles to the plane of Fig. 5, and may be considered as taken substantially along the line 6—6 of Fig. 4 in the direction indicated by the arrows;

Fig. 8 is a vertical sectional view of a detail and may be considered as taken substantially along the line 8—8 of Fig. 4 in the direction indicated by the arrows;

Fig. 9 is a view similar to Fig. 8 but taken in the direction of the arrows along the line 9—9 of Fig. 4; and Fig. 10 is a fractional sectional view taken in a vertical plane in the direction indicated by the arrows along the line 10—10 of Fig. 4.

Figure 3:
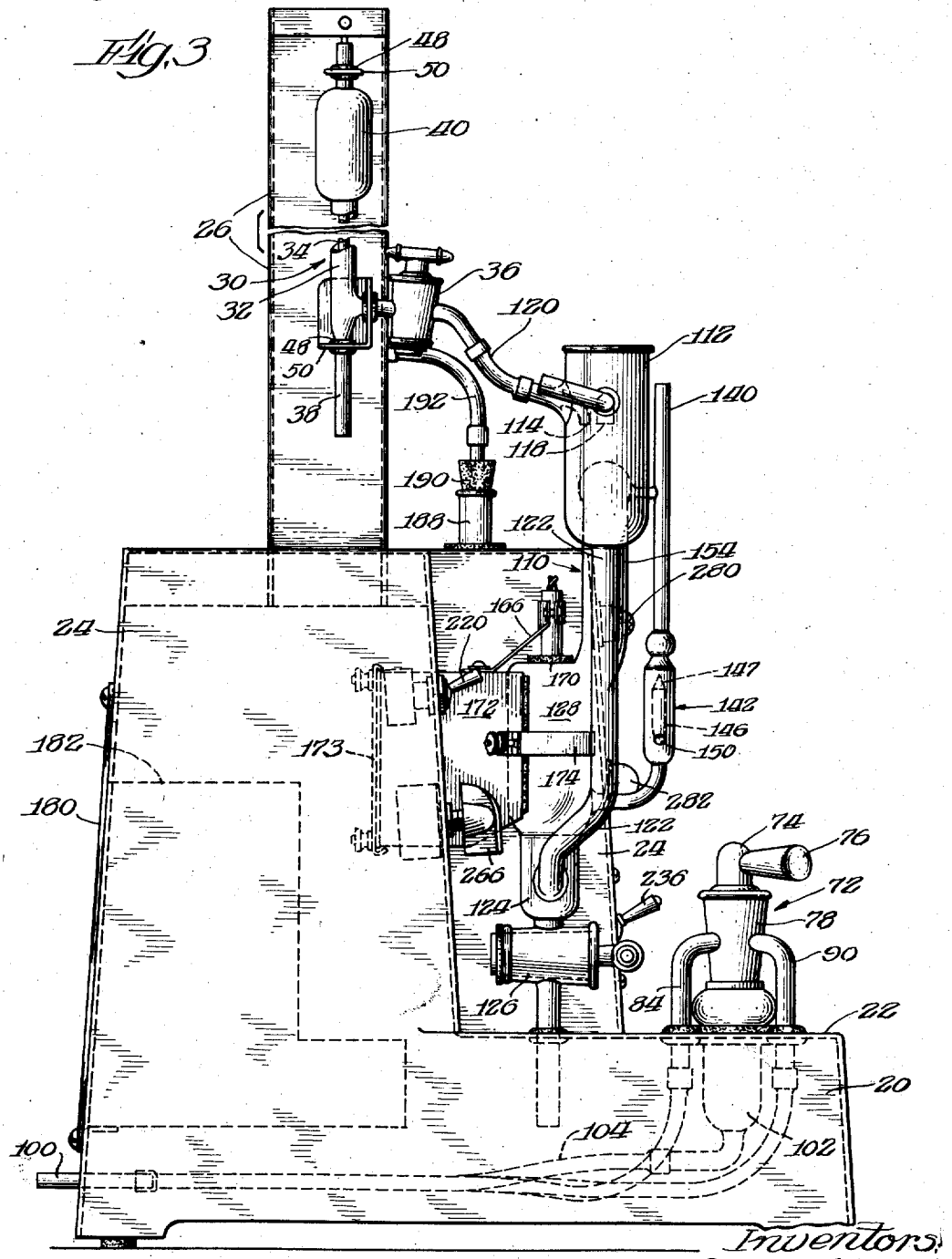
Fig. 3 is an elevation of the apparatus as viewed from the line 3—3 of Fig. 1.

One form of apparatus which incorporates the subject matter of the present invention is displayed generally in Fig. 1, where it will be seen that it includes a hollow rather deep base 20 having a flat upper surface 22 which supports a generally L-shaped upwardly extending hollow housing 24. As shown, the hollow base and housing are formed as an integral unit with their interiors communicating. A housing 26 extends upwardly from the housing 24 and serves to support a pair of burettes 28 and 30 in vertical position. The hollow base 20 and housing 24 serve to enclose certain electronic and other equipment to be described presently and preferably, therefore, the tower 26 is formed as a tube communicating through the top of the housing 24 at its lower end and with the atmosphere at its upper end. In addition to supporting the burettes 28 and 30, therefore, it serves as a ventilating stack for promoting a good circulation of air around the mechanism within the hollow base and housing 24.

The burette shown at 30 is of the annular type and is formed of an outside glass tube 32 which encloses a coaxial small diameter tube 34, Fig. 8. At the lower end the outside tube 32 is sealed to the smaller diameter tube and is provided with a stopcock 36 through which the contents of the annular space between the two tubes can be drawn. The innermost tube 34 is connected to a downward extension 38 through which the burette is filled. At its upper end the large diameter outside tube 32 is formed to provide a bulb 40 through which the smaller tube 34 passes, the two being sealed together as at 42 to provide a top closure for both tubes. At a point just below the bulb 40, the wall of the inner tube 34 is provided with a perforation 44 and a similar perforation 46 is provided at a higher level near the top of the bulb 40.

As shown, Fig. 1, this burette is mounted on the left hand side of the tower 26 in a position above the top of the housing 24. The support for the burette consists of suitable rubber grommets 48 attached to brackets 50 which in turn are fastened to the stack.

The burette 30 is filled by forcing the liquid, in the present case the starch solution, upwardly from a storage receptacle to the lower fitting 38 so that this solution overflows at the aperture 44 and fills the stopcock 36 and the annular space between the tubes 32 and 34. When the level of the liquid rises into the bulb 40, that is, above the opening 44, the pressure in the storage receptacle is relieved so as to permit the liquid to flow backwardly thereto. The level of the liquid therefore drops in the bulb 40, the liquid flowing into the tube 34 at the opening 44 until the level in the burette is at the level of the opening 44. This level therefore is marked to indicate the zero point and the tube 32 is conveniently graduated at suitable intervals therebelow.

The burette 28, which forms a calibrated container for the iodate solution, is formed of a length of glass tubing blown to provide a bulb 52 at the upper end thereof, Fig. 9. At its lower end this tube is closed and formed to provide a peg 54 used for mounting the burette. A parallel tube 56, which may be of smaller diameter, is positioned near the main tube and is joined thereto at its upper end at a position 58 somewhat below the lower end of the bulb 52 and at its lower end into a chamber 60 within the large tube in a position above the peg 54, but below the main portion 61 of the tube which is isolated therefrom by a plug 62. The chamber 60 is also connected to a filling fitting 64 which extends generally at right angles to the axis of the burette. Just above the plug 62 the lower end of the main portion 61 is connected to an outlet tube 66.

The zero point of this burette is at the level of the juncture, indicated at 58, between the large tube and the smaller parallel tube 56, and the region of the main tube 61 therebelow is graduated as at 68, preferably in terms of percentages of sulfur in a certain size sample. As with the other burette, this member 28 is mounted by means of suitable grommets and brackets indicated by the numeral 70. The burette 28 is filled by causing fluid to flow inwardly at the fitting 64 so that this fluid rises upwardly through the chamber 60, the side tube 56 and flow through the orifice 58 into the main tube 61. After the main tube has filled, the liquid level will rise into the bulb 52, after which the pressure at the inlet fitting 64 is released so as to permit the iodate solution to drain back to its reservoir. This action drains the liquid from the system excepting that which is trapped in the main tube 61 below the level of the orifice 58, thereby automatically filling the burette to its zero point.

Figure 4:
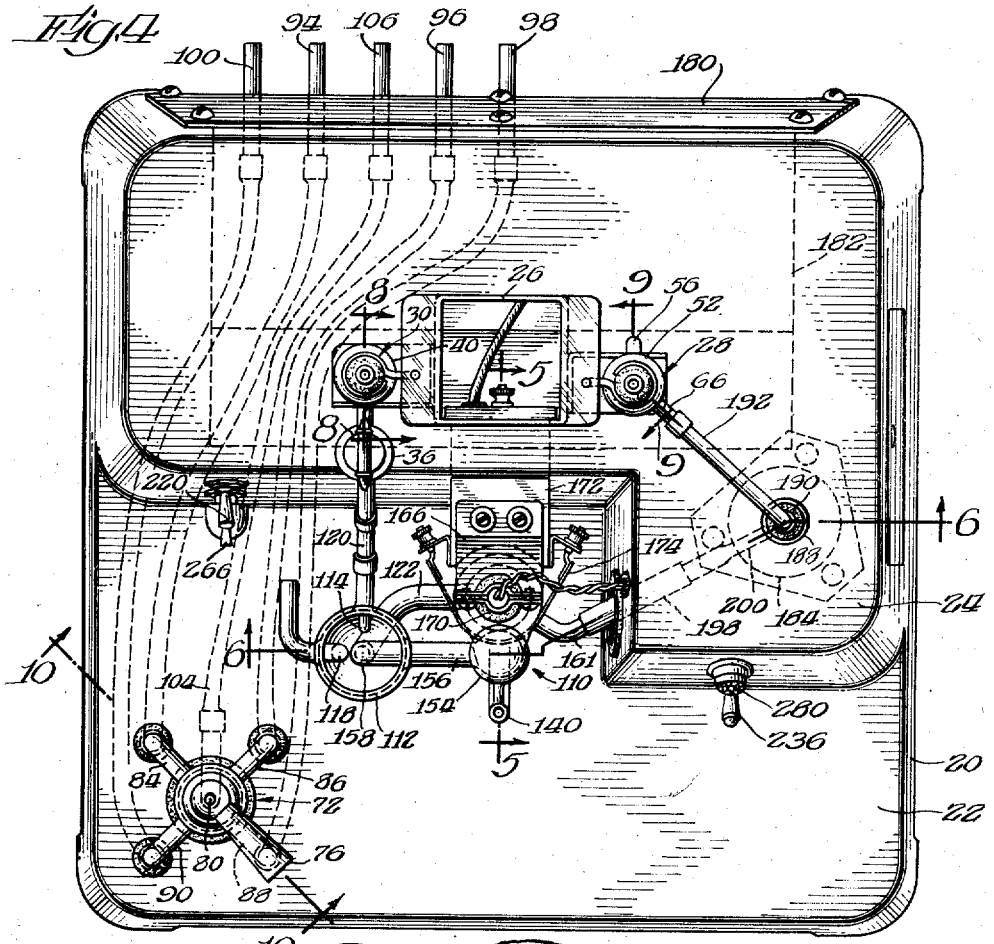
Fig. 4 is a top view of the apparatus.

A convenience for filling these burettes and for handling the hydrochloric acid solution and an additional solution which may be rinsing water, is provided in the form of a four-way stopcock indicated generally at 72, Figs. 1 and 10. This is mounted near the forward left-hand corner of the base 20, Fig. 1, and includes a rotatable valve plug 74 having a handle 76, the plug being fitted as is customary into a tapered socket in a valve body 78. The plug 74 has a passage 80 extending axially therethrough from top to bottom, this passage being intersected by a radial port 82. By rotating the plug, the port can be brought into communication with any one of four outlet tubes 84, 86, 88 and 90 which are formed as a portion of the valve body. Each of these four outlet tubes is bent over at right angles and extends through the base, where each is connected to a length of tubing. These tubes extend to the back of the base where they are attached to individual fittings best illustrated in Fig. 4. For convenience, these fittings and the tubing pieces connected thereto are designated by the numerals 94, 96, 98 and 100, and are connected respectively to the valve outlet fittings 84, 86, 88 and 90. At the lower end of the passage 80 the valve body is formed to provide a chamber 102 which is connected to a length of tubing 104 leading to a fitting 106 grouped with the others at the rear of the base.

In use the fitting 106 is connected to a source of compressed air at low pressure which may comprise a compressed air line, or, if desired, this fitting 106 may be attached to a conventional squeeze bulb which may be located at the front of the apparatus with its stem extending through an opening in the base. Each of the solutions to be used is placed in its own closed storage bottle below the table upon which the apparatus rests, and the upper portion, that is, the portion above the liquid level, of each of these containers is connected to one of the fittings 94, 96, 98 and 100. The outlet tube which extends from a position near the bottom leads to the place where this fluid is to be used. For instance, assume that the fitting 100 is connected to the starch bottle, the outlet tube from this bottle being connected to the starch pipette filling fitting 38. Similarly, the fitting 94 is connected to the iodate bottle, and the outlet of the iodate bottle to the inlet fitting 64 of the pipette 28. Fitting 96 can be connected to the bottle containing the hydrochloric acid solution, and fitting 98 if desired can be connected to a reservoir containing water for rinsing the equipment.

The valve 72 is used as follows. If it is assumed, for instance, that it is desired to fill the iodate burette, valve plug 74 is turned to align port 82 with the outlet tube 84 leading to the iodate bottle. The opening at the top end of passage 80 is then covered with a finger thus preventing the escape of air and causing air to flow to the iodate bottle thereby increasing the pressure on the iodate solution and forcing it to the burette. After the burette is filled, the finger is removed from the end of the passage 80 thereby permitting air to escape from the iodate bottle so as to cause the iodate solution to return to the bottle by gravity. If a squeeze bulb is used as the source of compressed air, a few compressions of this bulb will suffice to transfer the solution from the storage receptacles to the burettes or other places of use, the bulb being compressed rapidly a few times after the opening at the end of the passage 80 is covered. From the above description of the use of the valve 72 it will be clear that the solutions can quickly be transferred from the several storage bottles so as to condition the apparatus for a determination.

A reaction vessel which is formed of glass is located directly in front of the center of the housing 24 as is indicated generally at 110. This vessel is made up of several elements secured together into an integral structure as follows: Directly in front of the starch burette 30, at the bottom thereof, is the top of the reaction vessel which at this point is formed to provide a comparatively large tubular reservoir section 112 which is open at the top. Two solution inlet fittings 114 and 118 extend through the side wall thereof and one of these, 114, is connected by a short length of plastic tubing 120 to the outlet of the stopcock 36 of the starch burette 30. The other inlet fitting, 118, is similarly connected by a length of plastic tubing, not shown, to the outlet fitting of the hydrochloric acid solution bottle.

The lower end of the reservoir portion 112 is connected to a length of downwardly extending glass tubing 122 which at its lower end curves to the right and is sealed into the side wall of a chamber 124 just above the bottom thereof. The bottom of this chamber ends in a stopcock 126 which can be opened for draining and flushing the reaction vessel. The chamber 124 extends upwardly and has a larger cylindrical section which provides an annular space or chamber 123 between its wall 128 and the wall of a smaller tube 130 which extends downwardly thereinto from the top. The tube 130 is open at the top and is sealed around its periphery to the top of the outer tube wall 128, and is closed at the bottom as at 132, Fig. 5. This lower end 132 also supports a downwardly extending hollow section 134 terminated by a quantity of glass frit 136 which is formed by sintering a quantity of small glass spheres so as to provide a highly porous body having small passages therethrough. The chamber 134 has an inlet fitting indicated at 138 which extends outwardly through the side wall of the reaction vessel 128 so as to form an inlet connection 140 which extends up along the side of the reaction chamber.

This inlet tube 140 contains a reverse flow check valve 142 which is comprised of a chamber 144 having a conical seat 143 at the upper end thereof and a hollow glass float 146 disposed therein. If liquid rises in the tube, the float moves upwardly so that its upper end 147, which is ground to fit the seat will form a seal to prevent liquid rising in the tube 140 above this position. In order to limit downward movement of the float within the chamber 144, the wall of the chamber is indented at a few spots below the float as at 150 so as to form supports therefor. The upper end of the tube 140 forms the inlet for the combustion gas when the apparatus is in use. It therefore is connected to the outlet of the combustion apparatus by suitable tubing not shown.

The upper portion of the annular chamber 123 is connected to an upwardly extending smaller chamber 154 which is closed at the top and near the top is connected to a horizontal passage forming member 156 which extends through the side wall of the reservoir 112 and terminates in a downwardly bent outlet 158. This outlet is just above the top of the downwardly extending tube 122 and in alignment therewith.

Near the bottom of the reaction chamber 123 there is an upwardly facing small opening 159 which is at the end of an L-shaped small bore tube 161. This tube extends outwardly through the side wall 128 of the vessel to form a fitting for the introduction of the iodate solution as will be described presently.

A spiral formed of glass rod indicated at 160 lies within the annular space 123. This spiral makes about one and one-half turns and is formed of a rod having a diameter such that it almost touches both the outer wall 128 and the inner wall 130 of the annular chamber. The fit should be close enough so that when the reaction vessel is filled with water, gas bubbles passing upwardly from the frit 136 will of necessity follow the spiral 160. That is, the bubbles cannot pass in a straight line from bottom to top of the reaction vessel because of the surface tension of the water which fills the small remaining space between the spiral 160 and the inner and outer walls of the annular chamber.

A small ruby red light bulb 162, Fig. 3, is secured in a socket 164 and positioned inside the inner tube 130 of the reaction chamber about half way between the top of the frit 136 and the upper end of the reaction chamber 123. The socket 164 is supported from above by a vertical stem 168 held by a bracket 166. Support is also provided by a rubber collar 170 which surrounds the stem 168 and fits into the top opening of the central tube 130. This collar 170 also serves to prevent extraneous light from entering the tube 130 from the top.

The position of the spiral element 160 in the annular space 123 is such that light from the bulb 162 can pass in a rearwardly direction through the inner and outer walls of the reaction vessel and through the liquid in the annular space therebetween. More specifically, one convolution of the spiral at the back side of the reaction vessel is in a position somewhat below the light bulb 162 whereas the next convolution directly thereabove is sufficiently above the light bulb so that gas bubbles following the bottom surface of the spiral on their way to the top of the reaction chamber are out of the path of the light passing from the bulb 162 to the rear.

Figure 7:
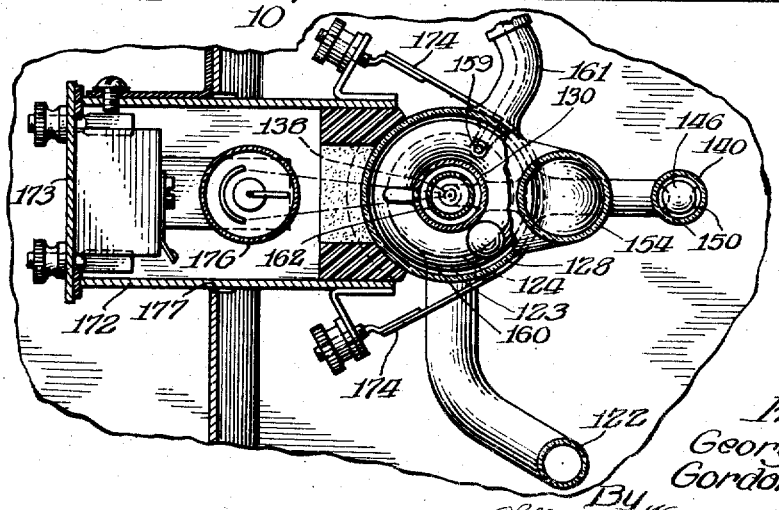
Fig. 7 is a fractional horizontal sectional view taken downwardly substantially along the line 7—7 of Fig. 5.

A generally rectangular small sheet metal housing 172 is secured to the reaction vessel by a clamping band 174, Figs. 6 and 7, in such fashion that the housing 172 is directly to the rear of the reaction chamber. This housing is closed at the back by a removable cover 173 and is substantially light-tight, excepting for the face which is against the reaction chamber and into which light from the bulb 162 passes. Within the housing a photoelectric cell 176 is mounted by a bracket secured to the cover 173 in a position to intercept the light beam from the bulb 162. Preferably this photoelectric cell should be of a type having a high degree of sensitivity to red light. For this purpose type 921 has been found to be satisfactory.

In order to form an integral removable assembly in which relative motion of the elements is unlikely, the bracket 166 which supports the bulb 162 is attached to the top of the housing 172. Thus, the reaction vessel, the light bulb, the photoelectric cell and its housing can be removed as a unit if desired for service. The front of the main housing 24 has an opening 177 therethrough to receive the rearward portion of the photoelectric cell housing 172.

So as to prevent extraneous light from passing through the glass reaction vessel and reaching the photocell 176, the entire portion of the reaction vessel, between the stopcock 126 and the horizontal extension 156 at the top thereof is covered with a light-impervious coating. For this purpose a neoprene or other synthetic rubber dip has been found to be satisfactory. This rubber coating preferably should also extend upwardly along the tube 122 to a position somewhat below its juncture with the reservoir 112. This coating as indicated by stippling in Fig. 1 is denoted by the numeral 178. For the sake of clarity the coating is not shown in the other figures.

The back of the main housing 24 has a comparatively large opening closed by a removable panel 180. This panel serves as the support for an electronic chassis 182 which occupies the position generally shown in dotted lines in Fig. 3. The electronic circuit includes the photocell 176 and operates in a manner to be described presently, so as to energize a solenoid coil under certain conditions. This coil is indicated at 184 in Fig. 6 and serves to operate a valve to control the admission of the iodate solution to the reaction vessel.

This valve structure is best seen in Fig. 6 where it will be apparent that the solenoid coil 184 is suspended by means of screws 186 from the top of the main housing 24 and that a vertical glass tube 188 passes downwardly through the top of the housing 24 and through the center of the solenoid. At its upper end, the glass tube 188 is connected by means of a stopper 190 and a length of tubing 192 to the outlet fitting 64 of the iodate burette. At its lower end, in a position somewhat below the solenoid 184, the glass tube 188 is drawn down to smaller diameter to form a shoulder 194 and an outlet fitting 196 connected by pieces of tubing 198 and a glass elbow 200 to the inlet fitting 161 formed as a portion of the reaction vessel.

A soft neoprene rubber plug 202 is pressed into the tube 188 from the top thereof so that it rests against the shoulder 194. The upper surface of this plug is conical as is indicated at 204, and a passage 206 is formed through the plug from top to bottom at the axis thereof.

An armature 208 is positioned in the tube 188 directly above the rubber plug 202, and rests with its lower end against the conical nose thereof. As shown, the armature 208 consists of a square bar and is of a size to loosely fit the bore of the tube 188 across the corners thereof. The ends of the bar 208 are rounded somewhat and at least the lower end is ground flat at the center so that under the influence of the weight of the armature 208, the soft rubber conical nose of the plug 202 will be compressed sufficiently to form a tight seal, thereby cutting off flow of the iodate solution through the passage 206. So as to avoid the effects of corrosion, the armature 208 in the apparatus shown has been formed from substantially pure nickel which has sufficient magnetic permeability for the present purpose.

When the armature 208 is resting against the upper surface of the plug 202, it is below the center of the solenoid 184 so that when this solenoid is sufficiently energized, the armature 208 will be lifted, thereby permitting fluid to flow from the burette through the tubes 192 and 188, through the passage 206 and by way of the tubes 200 and 161 into the lower portion of the reaction chamber 123 of the reaction vessel. As was noted previously, the passage through the tube 161 is comparatively small and this has the result of preventing appreciable mixing between the fluid in the reaction chamber 123 and the iodate solution in the tube 161.

The circuit for the electronic equipment is illustrated in Fig. 2. Some of the control elements of this electronic circuit appear on the face of the housing 24 and, in those instances where they do, they have been indicated by the same numerals used to indicate these circuit components in the diagram of Fig. 2.

Referring primarily to Fig. 2, a pair of power leads are indicated at 210 and 212. They may be considered as supplying 60 cycle current at a nominal 115 volt potential. One of these is connected directly to one end of the primary 214 of a power transformer 216, while the other end of this primary is connected through a fuse 218 and on-off switch 220 to the other lead 212. The transformer 216, which preferably is of the volting regulating type, has three secondaries, two of which, 222 and 224 supply filament voltages at appropriate levels for the particular tubes to which they are connected. The third secondary winding, 228 is center tapped at 230 and supplies 300 volts from each end 232 and 242 to this center tap. A capacitor 233 is connected across the leads 232 and 242. One end 232 of the secondary 228 is connected through the solenoid coil 184 which in the present instance has a resistance of approximately 1800 ohms to the movable contact 234 of a single pole, double throw, toggle switch indicated generally by the numeral 236. This switch is designed to latch in one position when the contact 234 is connected to a fixed terminal 238. The other connection, however, between the movable contact 234 and a terminal 240, is of the momentary type, such that this connection is maintained only while the switch is held; otherwise the switch takes a central position so as to open both circuits.

The other end lead 242 of the high voltage secondary 228 is connected to the cathode of a rectifier tube 244 which in this specific circuit is a 6X5GT. The filament of this tube is energized from the transformer secondary 224 and the anodes thereof are connected together and by way of a resistor 246 to a lead 248 which is connected to the cathode of a voltage control tube 250, the cathode of the photocell 176, and the cathode of a pentode indicated at 254. As mentioned earlier, the photocell 176 is of the 921 type. The voltage regulator 250 may be of the OA3 variety, while the pentode used at 254 may be a 6J7. The lead 248 is connected by a branch 256 and filter capacitor 258 to the switch terminal 240 and to the transformer lead 230 and this transformer lead is also connected to the anodes of the rectifier tube 244 by way of a second filter capacitor 260.

The anode of the photocell 176 is connected directly to the control grid of the pentode 254 and by way of a resistor 262 to the anode of the voltage control tube 250 and to the screen grid of the pentode 254. This lead is also connected to ground through three resistors in series which form a voltage divider. They are as follows: A fixed resistor 264, the resistor element of a potentiometer 266 and a variable resistor 268. The movable tap of the potentiometer 266 is connected to the filament of the pentode 254, to the suppressor grid and to the cathode thereof. The anode of the voltage regulating tube 250 is also connected through a resistor 270 to a line 272 connected in turn to the filament, the cathode, and the second grid of a thyratron tube at 274. The tube used in this position in this specific circuit is a 2050. The lead 272 is also connected through another resistor 276 to the high voltage center tap 230, this lead 230 also being connected through a resistor 278 to the first grid of the thyratron 274 and also to the plate of the pentode 254.

The ruby red bulb 162 is connected in parallel with a pilot bulb 280 and these two lamps are energized from the secondary 224 of the transformer 216. In order to indicate when the solenoid 184 is being energized, a small neon flasher bulb 282 is connected in parallel therewith.

It will be appreciated that this circuit may be varied considerably and that no limitation should be presumed because a specific operative circuit is set forth in the interest of completeness. The actual values used and found to be satisfactory in the above circuit are as follows—

| | | |
|---|---|---|
| Capacitors: | | |
| **233** | mfd | 0.8 |
| **258** and **260** | mfd | 20 |
| Resistors, in ohms unless otherwise noted: | | |
| **246** | | 2500 |
| **262** | meg | 22 |
| **264** | | 8200 |
| **266** and **268** | | 7500 |
| **270** | | 7500 |
| **276** | | 330 |
| **278** | meg | 1 |

The above described circuit and apparatus operate as follows: The burettes are filled with starch solution and the iodate solution as previously described, and the reaction vessel is filled with the hydrochloric acid solution so that this solution stands well up in the reservoir portion 112. A few milliliters of the starch solution are then added by operation of the stopcock 36, and oxygen is admitted to the fitting 140 so that bubbles pass upwardly from the frit 136 through the reaction chamber and thus pass through the horizontal passage 156 so as to exit at the end 158 thereof. At this point most of the bubbles escape and rise through the reservoir 112 and pass off into the atmosphere while the liquid recirculates through the downwardly extending leg 122 to the bottom of the reaction vessel. There is, therefore, a continuous circulation of liquid which is counterclockwise through the apparatus as seen in Fig. 6.

The electrical circuit is turned on by operating the master switch 220, and the electronic equipment is permitted to warm up for a short period with the switch 236 in the off position. When this switch is moved to connect contacts 234 and 238, the light from the ruby bulb, passing to the photocell, causes this tube to conduct. This reduces the grid voltage on the pentode 254 and cuts off the current therethrough. This raises the potential on the grid of the thyratron 274, thereby causing this tube to conduct. Current is therefore drawn through the solenoid 184, switch contacts 234 and 238, tube 274 and resistor 276.

Energization of the solenoid 184 lifts the armature 208 and permits iodate solution to pass slowly into the reaction vessel by way of the opening 159. Under these conditions, the solution within the reaction chamber changes rapidly to a comparatively deep blue color, as the quantity of iodine is increased, thereby reducing the light falling upon the photocell. This continues until the current through this tube drops until the increase in potential on the pentode grid thus brought about causes the pentode to conduct. This action turns off the thyratron tube 274 and deenergizes the solenoid 184.

The intensity of the blue color which is obtained before the valve 202—208 is closed can be precisely adjusted by movement of the slider of the potentiometer 266. All the adjustment needed can be obtained from this potentiometer if it is originally positioned near its center and the variable resistor 268 is adjusted to give roughly the depth of color desired. The variable resistor 268, therefore, may be located upon the chassis, since it seldom needs adjustment, whereas the control for the potentiometer 266 is preferably located for easy access by the operator. It is shown in such position in Fig. 1.

After the equipment has stabilized with the blue color prevailing in the reaction vessel, the iodate burette is refilled and the apparatus is ready for a titration. From the circuit it will be apparent that the pilot lamp 280 indicates to the operator whenever the master switch 220 is turned on and that the bulb 282 will flash whenever the solenoid 184 is momentarily energized, thereby notifying the operator whenever iodate solution is being added to the reaction vessel. The switch 236 as mentioned is ordinarily placed in the central position for warming up the apparatus and is moved to connect terminals 234 and 238 for an automatic titration. It may, however, be depressed from the central position so as to connect terminals 234 and 240 for manually titrating a solution, the valve solenoid 184 being energized whenever contacts 234 and 240 are brought together.

After the apparatus has been conditioned as described above, and with the oxygen flowing through the equipment as previously described, the combustion apparatus is actuated to burn the analytical sample so as to produce sulfur-dioxide from the sulfur constituent thereof. As the sulfur dioxide bearing gas passes into the reaction vessel by way of the frit 136, the gas is broken up into fine bubbles which rise against the under surface of the spiral 160 in such fashion that they do not intercept the light to the photocell. This gas reacts to convert iodine in the solution to hydrogen iodide and so has a tendency to bleach the solution to a lighter blue color, thereby increasing the amount of light received by the photocell.

The solenoid is therefore energized and armature 208 is lifted sufficiently to permit a small amount of the iodate solution to be added to the reaction vessel, thereby restoring the blue color to its original level. As soon as the blue color has been restored, the armature 208 settles against the nose of the rubber plug 202 thereby cutting off the addition of any more iodate solution. The sensitivity of the apparatus is such that during the course of a titration the iodate solution will be added periodically as needed but it is impossible by visual inspection at any time to detect the fact that the solution has changed color.

The end of the titration is indicated when no more iodate solution is being added to the reaction chamber. This can be told by the fact that the neon bulb 282 has ceased flashing. Therefore, after a short interval of time during which the neon light has not flashed, the technician reads the percentage of sulfur in the sample directly from the iodate burette 28.

The switch 236 is then returned to its central position, and the stopcock 126 is opened to drain the solution from the reaction vessel. After closure of this stopcock, the apparatus is again filled with hydrochloric acid solution, the starch solution is added, and the switch 236 is shifted so as to close contacts 234 and 238, thereby causing iodate solution to be added so as to condition the apparatus for an additional titration. The iodate burette is then refilled, and the apparatus is ready for a new automatic titration.

From the above description of a specific embodiment of our invention it will be apparent that variations and substitutions can be made without departing from the scope or spirit of the invention and that the scope of the invention is to be measured by the scope of the following claims.

Having described our invention, what we claim as new and useful and desire to secure by Letters Patent is:

1. In an automatic titrator for reacting sulfur dioxide in a gas with an iodate solution in the presence of starch as an indicator, means forming a generally vertically disposed annular reaction chamber of transparent material, a source of light low in blue at substantially the axis of said chamber, a photoelectric cell having a high order of sensitivity below the blue range disposed outside said chamber in a position to intercept illumination from said source which passes through liquid in said annular chamber so that the amount of illumination effective upon said cell depends upon the intensity of the blue color of the liquid, means forming a passage connecting the top of said chamber to the bottom thereof, means for introducing a gas to be tested having sulfur dioxide therein into the bottom of said chamber in the form of small bubbles so that bubbles rise from bottom to top through the liquid in said chamber, baffle means in said chamber to prevent bubbles from passing between said source and said photoelectric cell, means including an electrically actuated valve for introducing an iodate solution into said chamber near the bottom thereof when said valve is energized, and electric circuit means including said photoelectric cell for energizing said valve when the effective illumination in said photoelectric cell rises to a predetermined level and for closing said valve when the effective illumination on said cell is at or below said predetermined level.

2. In an automatic colorimetric titrator, means forming a generally vertically disposed annular reaction chamber of transparent material, a source of illumination at substantially the axis of said chamber, a photoelectric cell disposed outside said chamber in a position to intercept illumination from said source which passes through liquid in said annular chamber so that the amount of illumination received by said cell depends upon the light transmitting characteristics of the liquid, means forming a passage outside said chamber for the circulation of liquid from the top of said chamber to the bottom thereof, means for introducing a gas to be tested into the bottom of said chamber in the form of small bubbles so that bubbles rise from bottom to top through the liquid in said chamber, baffle means in said chamber to prevent bubbles from passing between said source and said photoelectric cell, means including an electrically actuated valve for introducing a titer into said chamber near the bottom thereof when said valve is open, and electric circuit means including said photoelectric cell for opening said valve at a certain intensity of illumination on said photoelectric cell.

3. In an automatic colorimetric titrator, means forming a reaction chamber of transparent material, a source of illumination, a photoelectric cell disposed to intercept illumination from said source which passes through liquid in said reaction chamber so that the amount of illumination received by said cell depends upon the light transmitting characteristics of the liquid, means for recirculating a stream of liquid through said reaction chamber in one direction, means for introducing a gas to be tested into said reaction chamber in the form of small bubbles upstream of a line between said source and said cell, baffle means in said reaction chamber to prevent bubbles from intercepting light passing between said source and said photoelectric cell, means including an electrically actuated valve for introducing a titer into said chamber upstream of said line when said valve is open, and electric circuit means including said photoelectric cell for opening said valve at a certain intensity of illumination on said photoelectric cell.

4. Automatic titrating apparatus for carrying out a chemical reaction of the type in which the addition of a gaseous substance to a liquid in a reaction chamber changes the optical properties of the liquid in one direction and the addition of an appropriate amount of a reagent of known titer to the liquid in the chamber reacts therewith so as to restore the original optical properties to the liquid, comprising: means forming a reaction chamber to contain said liquid, said chamber having a transparent region so that light can pass therethrough and through the liquid in said chamber, means for substantially preventing bubbles in said liquid from obstructing said region, a light source on one side of said region, means sensitive to light incident thereon for changing the conditions in an electrical circuit, the last said means being located on the other side of said region to receive light from said source which has passed through the liquid in said region, so that the light received by the last said means depends upon the optical properties of said liquid, means for adding said substance to said liquid, means including a valve for adding said reagent to said liquid when said valve is open, electrical means including said light sensitive means for automatically opening said valve when the optical properties of said liquid are sensibly changed in said one direction and for closing said valve when the optical properties of said liquid are substantially restored, and means for preventing stagnation of the liquid in said reaction chamber.

*5. In a colorimetric titrator, means forming a reaction chamber, a source of illumination, a photoelectric cell disposed to intercept illumination from said source which passes through liquid in said reaction chamber so that the amount of illumination received by said cell depends upon the light transmitting characteristics of the liquid, means for recirculating a stream of liquid through said reaction chamber in one direction, means for introducing a gas to be tested into said reaction chamber in the form of small bubbles upstream of a line between said source and said cell, baffle means in said reaction chamber to prevent bubbles from intercepting light passing between said source and said photoelectric cell, means including a valve for introducing a titer into said chamber upstream of said line when said valve is open, and electric circuit means including said photoelectric cell for responding to the intensity of illumination on said photoelectric cell.*

*6. Titrating apparatus for carrying out a chemical reaction of the type in which the addition of a gaseous substance to a liquid in a reaction chamber changes the optical properties of the liquid in one direction and the addition of an appropriate amount of a reagent of known titer to the liquid in the chamber reacts therewith so as to restore the original optical properties to the liquid, comprising: means forming a reaction chamber to contain said liquid, said chamber having a region through which light can pass by way of the liquid in said chamber, means for substantially preventing bubbles in said liquid from obstructing said region, a light source on one side of said region, means sensitive to light incident thereon for changing the conditions in an electrical circuit, the last said means being located on the other side of said region to receive light from said source which has passed through the liquid in said region, so that the light received by the last said means depends upon the optical properties of said liquid, means for introducing said substance into said liquid, means including a valve for adding said reagent to said liquid when said valve is open, electrical means adapted for use in controlling said valve and connected to said light sensitive means to respond automatically to changes in the light received by said light sensitive means, and means for preventing stagnation of the liquid in said reaction chamber.*

*7. Titrating apparatus for carrying out a chemical reaction of the type in which the addition of a gaseous substance to a liquid in a reaction chamber changes the optical properties of the liquid in one direction and the addition of an appropriate amount of a reagent of known titer to the liquid in the chamber reacts therewith so as to restore the original optical properties to the liquid, comprising: means forming a reaction chamber to contain the liquid, said chamber having a region through which light can pass by way of the liquid in said chamber, means for substantially preventing bubbles in said liquid from obstructing said region, a light source on one side of said region, means sensitive to light incident thereon for changing the condition in an electrical circuit, the last said means being located on the other side of said region to receive light from said source which has passed through the liquid in said region, so that the light received by the last said means depends upon the optical properties of the liquid, means for introducing the substance into the liquid, means including a valve for adding the reagent to the liquid when said valve is open, electrical circuit means connected to said light sensitive means to respond automatically to changes in the light received by the latter, and means for preventing stagnation of the liquid in said reaction chamber.*

*8. In titrating apparatus, the combination of a reaction chamber adapted to contain an indicator solution, a source of illumination and a photoelectric cell spaced from each other across a region of said reaction chamber so that the cell receives light from said source through said region, means for introducing gaseous fluid into a portion of said reaction chamber below said chamber region, baffle means in said chamber positioned between said region and said portion for intercepting bubbles rising from said portion, said baffle means being disposed in relation to said chamber region to shield said region from rising gas bubbles and to direct bubbles intercepted by the baffle means around said region to flow through the chamber past said region in proximity thereto, means for introducing a reagent into said chamber and including control means for controlling the amount of reagent introduced into the chamber, and electrical circuit means coacting with said photoelectric cell to respond to changes in the light received by said cell from said source through said chamber region kept clear of gas bubbles by said baffle means.*

*9. In titrating apparatus, the combination of means defining a reaction chamber adapted to contain an indicator solution, a source of illumination and a photoelectric cell spaced from each other across a region of said reaction chamber so that the cell receives light from said source through said region, means for introducing gaseous fluid into a portion of said reaction chamber below said region thereof, said reaction chamber defining means including means for preventing bubbles rising in said reaction chamber from passing through said region thereof whereby said region is kept clear of undissolved gas bubbles, means for introducing a reagent into said chamber and including flow control means for controlling the amount of reagent admitted to the chamber, and electrical circuit means coacting with said photoelectric cell to respond to changes in the light received by said cell through said chamber region from said source.*

(References on following page)

References Cited in the file of this patent or the original patent

UNITED STATES PATENTS

| | | |
|---|---|---|
| 2,105,262 | Price | Jan. 11, 1938 |
| 2,161,453 | Busby et al. | June 6, 1939 |

5

FOREIGN PATENTS

| | | |
|---|---|---|
| 873,318 | Germany | Apr. 13, 1953 |
| 457,910 | Great Britain | Dec. 8, 1936 |